US005223770A

United States Patent [19]

Schlessmann

[11] Patent Number: 5,223,770

[45] Date of Patent: Jun. 29, 1993

[54] PORTABLE HANDHELD WORK APPARATUS HAVING AN ELECTRIC DRIVE MOTOR

[75] Inventor: Helmut Schlessmann, Waiblingen, Fed. Rep. of Germany

[73] Assignee: Andreas Stihl, Waiblingen, Fed. Rep. of Germany

[21] Appl. No.: 863,789

[22] Filed: Apr. 6, 1992

[30] Foreign Application Priority Data

Apr. 4, 1991 [DE] Fed. Rep. of Germany ....... 4110826

[51] Int. Cl.[5] ......................... A01G 3/06; B26B 27/00

[52] U.S. Cl. .................................... 318/17; 200/332.2

[58] Field of Search .......................... 318/17; 388/937; 200/332.2; 310/47, 50

[56] References Cited

U.S. PATENT DOCUMENTS

| | | | |
|---|---|---|---|
| 3,671,699 | 6/1972 | Matthews | 200/157 |
| 3,703,646 | 11/1972 | Jacyno | 310/47 |
| 3,755,640 | 8/1973 | Kaman et al. | 200/522 |
| 3,766,348 | 10/1973 | Johnson | 200/157 |
| 3,973,179 | 8/1976 | Weber et al. | 200/157 X |
| 4,054,766 | 10/1977 | Kramer | 200/157 |
| 4,064,447 | 12/1977 | Edgell et al. | 200/157 X |
| 4,081,704 | 3/1978 | Vassos et al. | 310/50 |
| 4,179,644 | 12/1979 | Vassos | 200/145 X |
| 4,480,205 | 10/1984 | Nymann | 310/47 |

*Primary Examiner*—Bentsu Ro

*Attorney, Agent, or Firm*—Walter Ottesen

[57] ABSTRACT

The invention relates to a portable handheld work apparatus having an electric drive motor mounted in a housing. A switch unit switches a supply voltage onto the drive motor. The switch unit is actuated by a switching extension of a switching lever journalled in a handle of the work apparatus. The switching lever has an actuating portion which extends outwardly from the handle housing. An elastic resilient tongue is arranged on the switching lever in order to ensure a trouble-free opening of the electric contacts of the switch unit and to ensure that an adequate contact spacing in the at-rest position is maintained. The tongue lies against an abutment fixed in the housing and the switching lever is held under a spring force against an at-rest stop in the handle housing.

13 Claims, 2 Drawing Sheets

PORTABLE HANDHELD WORK APPARATUS HAVING AN ELECTRIC DRIVE MOTOR

FIELD OF THE INVENTION

The invention relates to a portable handheld tool such as a brushcutter, motor-driven chain saw, hedge trimmer or the like.

BACKGROUND OF THE INVENTION

In portable handheld tools such as brushcutters, motor-driven chain saws, hedge trimmers, drills and the like, an electric drive motor is switched on and off via a switch unit. The switch unit is held in the housing of the work apparatus and is actuated via a switch lever which has an actuating segment extending from the housing and which is depressed by the operator against the spring force of the switch unit.

The spring force of the switch unit acting in the opening direction is intended to provide a reliable opening of the electric switch contacts of the switch unit and to ensure that the contacts have an adequate at-rest spacing from each other in order to reliably prevent electric arcs which would otherwise damage the contacts.

It is known to simultaneously utilize the spring force of the switch unit acting in the opening direction to return the switch lever to its rest position. However, this requires a precise matching of the rest position of the contact actuator and the rest position of the switch lever in order, on the one hand, to ensure a reliable opening of the electric switch contacts of the switch unit and, on the other hand, to ensure the rest position of the switch lever. Because of the occurring tolerances, the condition can arise that in the rest position in the switch lever, the contact actuator of the switch unit is depressed through a partial stroke whereby the at-rest spacing of the electric switch contacts in the switch unit is reduced. This can lead to electric arcs which are not interrupted because of the small contact spacing when opening the switch unit and which then destroy the switch unit. When a welding of the switch contacts occurs which cannot be prevented, a dangerous condition is present for the operator of the work apparatus since the drive motor can no longer be switched off.

SUMMARY OF THE INVENTION

It is an object of the invention to provide a portable handheld tool wherein a complete opening of the electric contacts of the switch unit is guaranteed independently of occurring tolerances in the at-rest position of the switch lever.

The object is achieved with the portable handheld work apparatus of the invention. The work apparatus can, for example, be a brushcutter, motor-driven chain saw, hedge trimmer or the like. The work apparatus of the invention includes: a motor housing; an electric drive motor for driving a work tool, the drive motor being mounted in the housing; voltage supply means for supplying an operating voltage for the drive motor; a handle associated with the motor housing and including a handle housing; a switch unit mounted in the handle housing and being actuable for applying and disconnecting the operating voltage to and from the drive motor; a switching lever arranged in the handle housing and having an actuating portion extending out of the handle housing so as to be actuable by an operator of the work apparatus; the switching lever being pivotally mounted in the handle housing so as to be pivotally movable between an at-rest position and an actuating position when the operator applies pressure to the actuating portion; stop means formed on the housing for contact engaging the switching lever to define the at-rest position; the switching lever having a switching extension for acting on the switch unit to actuate the switch unit to apply the operating voltage to the drive motor when the switching lever is pivotally moved from the at-rest position to the actuating position; and, resilient biasing means for resiliently biasing the switching lever into the at-rest position; the resilient biasing means including an elastic-resilient tongue disposed on the switching lever; and, abutment means formed on the handle housing for acting on the tongue so as to cause a resilient force to develop in the tongue for resiliently holding the switching lever against the stop means.

The elastic resilient tongue associated with the switch lever acts in the manner of a leaf spring in that the tongue holds the switch lever under spring force against a rest stop. The opening force acting on the contact actuator of the switch unit acts then exclusively to produce the at-rest spacing of the electric contacts. Tolerances which may occur and which can lead to a play between the switch extension of the switch lever and the contact actuator of the switch unit do not affect operability. The switching lever is held firmly against its at-rest stop by the resilient tongue so that the electrical contacts of the switch unit assume the pregiven at-rest spacing pregiven according to the design of the switch unit. When the switch unit is opened, possibly occurring electric arcs are interrupted with certainty when the switching lever reaches its rest position so that an increased wear of the electric contacts is precluded and a dangerous welding of the contacts is avoided. The desired actuating force can be easily set by means of an appropriate selection of the width and thickness of the tongue.

BRIEF DESCRIPTION OF THE DRAWINGS

The invention will now be described with reference to the drawings wherein.

DESCRIPTION OF THE PREFERRED EMBODIMENTS OF THE INVENTION

Figures 1, 3:
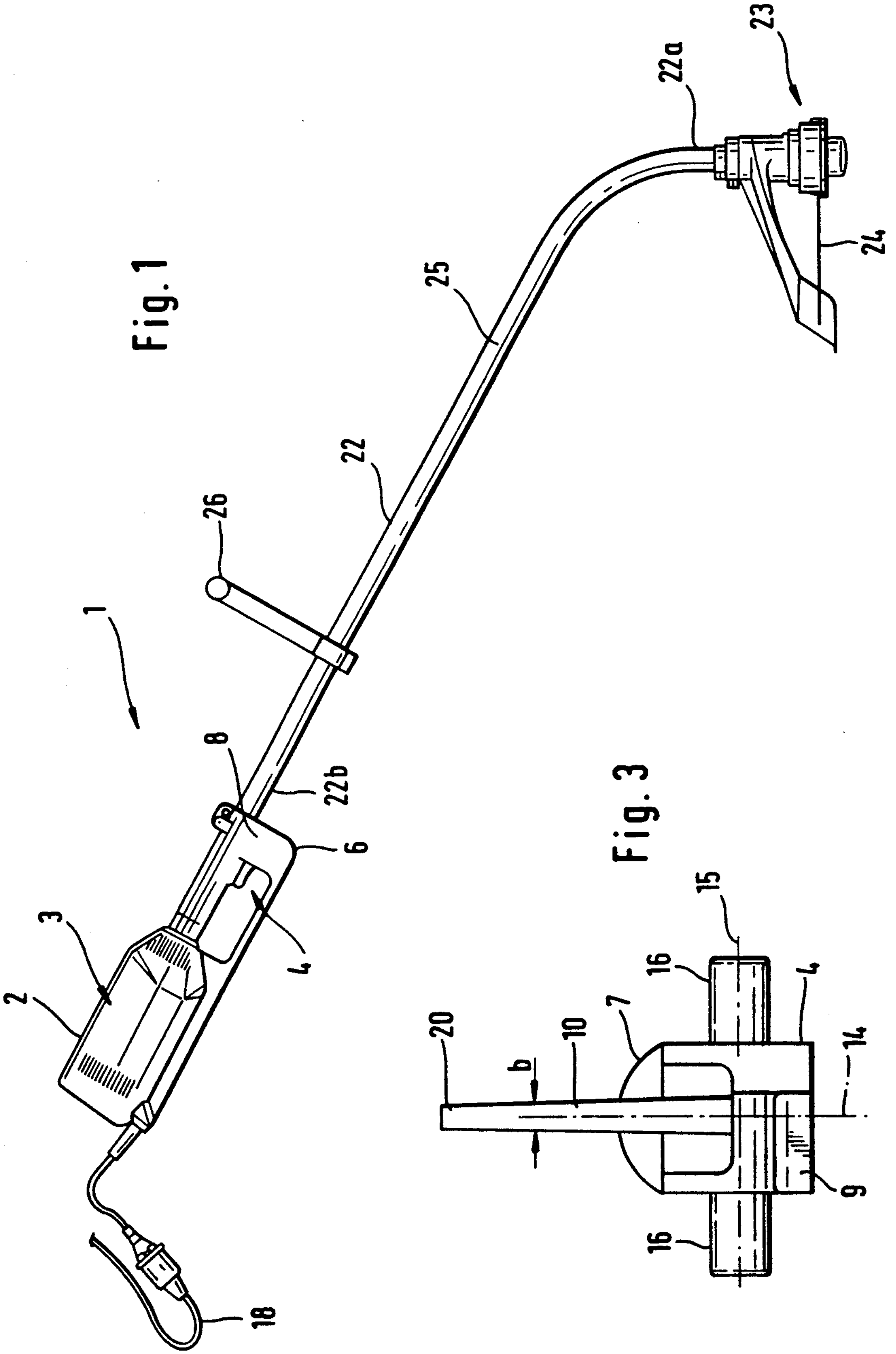
FIG. 1 is a schematic of a portable handheld work apparatus in the form of a brushcutter or string trimmer.

The work apparatus 1 shown in FIG. 1 includes a guide tube 22 having a curved end portion 22*a* with a cutterhead 23 mounted thereon. The cutterhead 23 includes a filament 24 which acts as a cutting element. A housing 2 is mounted at the other end 22*b* of the guide tube 22 and an electric drive motor 3 is mounted in the housing. The drive motor drives the cutterhead 23 via a flexible drive shaft 25 guided in the guide tube 22. A handle 6 is disposed forward of the housing 2 of the drive motor 3 and includes a handle housing 8 which is preferably formed as one piece with the housing 2 of the drive motor. The housing 2 of the drive motor and the housing 8 of the handle 6 preferably comprise two half-shells which are assembled to form the composite housing.

A guide handle 26 is attached to the guide tube between the ends 22*b* and 22*a* thereof so that an operator can carry and guide the work apparatus with one hand on the handle 6 and the other hand on the guide handle 26.

Figure 2:
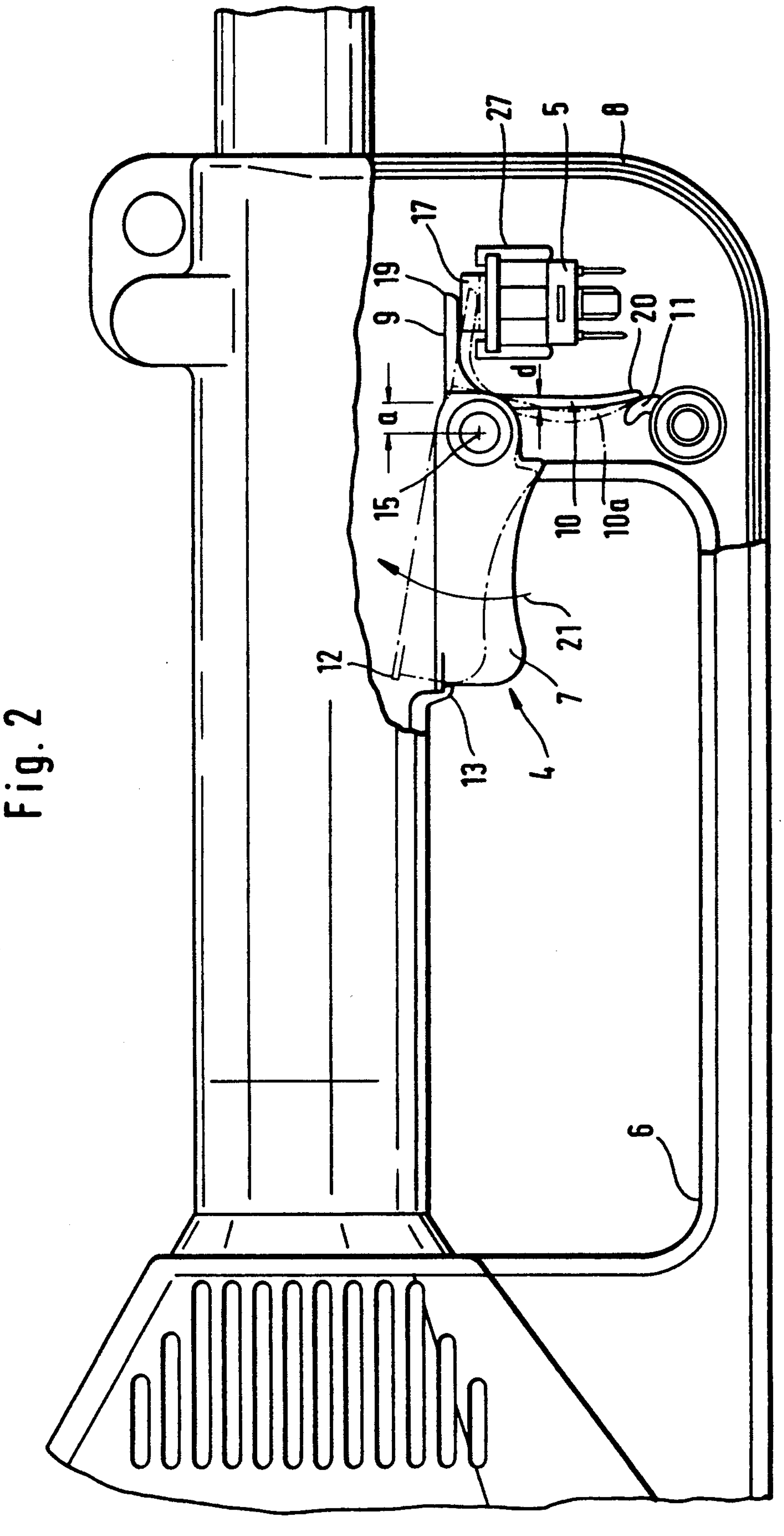
FIG. 2 is an enlarged schematic of the housing of the work apparatus of FIG. 1 with a portion of the wall thereof broken out to show the switching lever and switch unit; and, FIG: 3 is a front view of the switching lever journalled in the handle of the work apparatus.

In FIG. 2, a switching lever 4 is shown journalled in the handle 6 so as to be pivotally movable about the pivot axis 15. The pivot axis 15 is determined by two pivot pins 16 which are preferably made as one piece with the switching lever 4 with these pivot pins 16 being held in corresponding bearing openings of the housing halves of the handle 6.

The switching lever 4 projects with an actuating portion 7 from the handle housing 8 of the handle 6. The actuating portion 7 is actuated by a finger of the hand of the operator holding the handle 6.

A preferably rigid switching extension 9 is configured as one piece with the switching lever 4 and lies in a plane with the actuating portion 7. The switching extension 9 lies on the other side of the pivot axis 15 and, for the rest position of the switching lever 4 shown (solid line), the switching extension extends over the contact actuator 17 of the switch unit 5. The switch unit 5 is held in a fixed position in the handle housing 8 in a seat 27 fixedly formed in the handle housing 8.

When the switching lever 4 is pivoted about pivot axis 15 in the direction of arrow 21 by depressing the actuating portion 7, the free end 19 of the switching extension 9 presses the contact actuator 17 downwardly whereby the electric contacts of the switch unit 5 are closed. The free end 19 is preferably rounded. The supply voltage is supplied via a cable 18 and is applied to the drive motor when the contact actuator 17 is depressed. The drive motor then begins to run and to rotationally drive the cutterhead 23.

The switching lever 4 has an elastic resilient tongue 10 which is similar in its configuration and function to a leaf spring. The tongue 10 is preferably configured as one piece with the switching lever 4 and lies, in the pivot direction 21, with its free end 20 against a stop 11 fixedly disposed in the housing. The tongue 10 advantageously lies at a spacing (a) to the pivot axis 15 on the side of the switching extension 9 within the handle housing 8. As shown in FIG. 3, the tongue 10 lies approximately in the longitudinal center plane 14 of the switching lever 4 and tapers downwardly in its width (b) to the free end 20. As shown in FIG. 2, the tongue 10 advantageously tapers downwardly also in its thickness (d) to its free end 20. The spring force of the tongue 10 is easily preset with inputs as to width (b) and thickness (d) during design of the switching lever.

Viewed in the pivot direction 21, the tongue 10 follows the switching extension 9 which is preferably configured so as to be rigid. The tongue 10 and the switching extension 9 conjointly define an angle of approximately 90°. Viewed again in the pivot direction 21, the actuating portion 7 then follows the tongue 10 which together with the actuating portion 7 conjointly defines an angle which is likewise 90°.

The rest position of the switching lever 4 is shown in FIG. 2 by the solid line. In this position, the tongue is slightly bent against the abutment 11 which is disposed within the handle housing 8 and fixedly mounted thereon. In this way, a spring force is applied to the switching lever 4 in a direction opposite to the pivot direction 21. A catch 12 arranged at the free end of the actuating portion 7 is in this way held against a stop 13 fixed on the housing 8. The stop 13 then defines the at-rest stop for the switching lever 4. In this at-rest position of the switching lever, the switching extension 9 lies with its free end 19 (preferably with low play) over the contact actuator 17 without depressing the latter. The switch unit 5 has stops arranged therein against which the contact actuator 17 is held by an opening spring mounted in the switch unit. These stops determine the rest spacing of the electric contacts in the opening position of the switch unit.

The work apparatus 1 is operated by depressing the actuating portion 7 and, as described above, the switch unit 5 is actuated via the switching extension 9. The switch unit 5 switches the electrical supply voltage to the drive motor 3. In the depressed position of the switching lever 4 (phantom outline in FIG. 2), the tongue 10 operates as a leaf spring and is bent up to the position 10*a* shown in phantom outline and applies a correspondingly large return force to the switching lever 4. When releasing the actuating portion 7, the switching lever 4 pivots in a direction opposite to the pivot direction 21 under the action of the spring force of the tongue 10 into the rest position which is determined by the contact engagement of the catch 12 on the rest stop 13. In this way, it is ensured that a return force is applied to the switching lever 4 which is adjusted thereto and which ensures a reliable return of the switching lever into its at-rest position. The return force applied to the contact actuator 17 of the switch unit 5 then acts exclusively to open the electrical contacts and to maintain the at-rest spacing therebetween. In this way, a reliable opening and closing of the electric contacts is obtained without danger of electric arcs which cause wear.

According to a further embodiment of the invention, the abutment 11 fixed in the housing is rounded in the pivot direction 21 of the switching lever 4 so that a jamming of the free end 20 of the tongue 10 on the abutment 11 is reliably prevented. The free end 10 slides on the rounded abutment 11.

It is advantageous to injection mold the switching lever 4 from plastic with the actuating portion 7, the switching extension 9, the tongue 10 and preferably also the bearing pins 16 being injection molded as one piece.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus including a brushcutter, motor-driven chain saw, and a hedge trimmer, the work apparatus comprising:

- a motor housing;
- an electric drive motor mounted in said motor housing;
- voltage supply means for supplying an operating voltage to said drive motor;
- a handle associated with said motor housing and including a handle housing;
- a switch unit mounted in said handle housing and being actuable for connecting and disconnecting said operating voltage to said drive motor;
- a switching level arranged in said handle housing and having an actuating portion extending out of said handle housing so as to be actuable by an operator of said work apparatus;
- said switching lever being pivotally mounted in said handle housing so as to be pivotally movable between an at-rest position and an actuating position when the operator applies pressure to said actuating portion;

stop means formed on said housing for contact engaging said switching lever to define said at-rest position;

said switching lever having a switching extension for acting on said switch unit to actuate said switch unit to apply said operating voltage to said drive motor when said switching lever is pivotally moved from said at-rest position to said actuating position; and, resilient biasing means for resiliently biasing said switching lever into said at-rest position; said resilient biasing means including an elastic-resilient tongue disposed on said switching lever; and, abutment means formed on said handle housing for acting on said tongue so as to cause a resilient force to develop in said tongue for resiliently holding said switching lever against said stop means.

2. The portable handheld work apparatus of claim 1, wherein said tongue is formed as a single piece with said switching lever.

3. The portable handheld work apparatus of claim 2, wherein said switching lever defines a longitudinal center plane and said tongue is formed on said switching lever so as to lie in said plane.

4. The portable handheld work apparatus of claim 1, further comprising pivot means for pivotally mounting said switching lever in said handle housing; said pivot means defining a pivot axis about which said switching lever is pivotally moved between said at-rest position and said actuating position; and, said tongue being disposed at a distance from said pivot axis.

5. The portable handheld work apparatus of claim 4, wherein said tongue is arranged laterally of said switching extension.

6. The portable handheld work apparatus of claim 1, wherein said tongue has a free end for contact engaging said abutment means; and, said tongue has a width and a thickness which both taper down toward said free end.

7. The portable handheld work apparatus of claim 1, wherein said tongue is disposed on said switching lever so as to be disposed at 90° with respect to both said actuating portion and said switching extension.

8. The portable handheld work apparatus of claim 1, wherein said abutment means defines a rounded surface for contact engaging said tongue thereon.

9. The portable handheld work apparatus of claim 4, wherein said pivot means comprises: two bearing pins formed on said switching lever; and, two bearing openings formed in said handle housing for journalling corresponding ones of said bearing pins therein.

10. The portable handheld work apparatus of claim 9, wherein said switching lever includes said actuating portion, said switching extension, said bearing pins and said tongue all being injection molded from plastic as a single piece.

11. The portable handheld work apparatus of claim 1, wherein said switching extension is configured so as to be resistant to bending.

12. The portable handheld work apparatus of claim 1, wherein said switch unit has a contact actuator and said switching extension is in contact engagement with said contact actuator when said switching lever is in said at-rest position.

13. The portable handheld work apparatus of claim 1, wherein said switching extension has a rounded outer free end.

* * * * *

UNITED STATES PATENT AND TRADEMARK OFFICE
CERTIFICATE OF CORRECTION

PATENT NO. : 5,223,770

DATED : June 29, 1993

INVENTOR(S) : Helmut Schlessmann

It is certified that error appears in the above-identified patent and that said Letters Patent is hereby corrected as shown below:

In column 4, line 63: delete "level" and substitute -- lever -- therefor.

Signed and Sealed this

Fifteenth Day of March, 1994

Attest:

BRUCE LEHMAN

*Attesting Officer* *Commissioner of Patents and Trademarks*